United States Patent
Ashida

(10) Patent No.: US 10,713,763 B2
(45) Date of Patent: Jul. 14, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Jumpei Ashida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 16/120,499

(22) Filed: Sep. 4, 2018

(65) Prior Publication Data

US 2018/0374201 A1 Dec. 27, 2018

Related U.S. Application Data

(63) Continuation of application No. PCT/JP2017/003467, filed on Jan. 31, 2017.

(30) Foreign Application Priority Data

Mar. 10, 2016 (JP) .................................. 2016-047605

(51) Int. Cl.
    *G06K 9/00* (2006.01)
    *G06T 5/00* (2006.01)
    (Continued)

(52) U.S. Cl.
    CPC ................ *G06T 5/006* (2013.01); *G06T 3/00* (2013.01); *G06T 3/0006* (2013.01); *G06T 5/50* (2013.01);
    (Continued)

(58) Field of Classification Search
    CPC .. G06T 5/006; G06T 7/50; G06T 3/00; G06T 3/0006; G06T 5/50; G06T 3/20;
    (Continued)

(56) References Cited

U.S. PATENT DOCUMENTS 7,394,946 B2 * 7/2008 Dewaele ................... G06T 7/66
                                                                  345/619
7,903,849 B2    3/2011 Kimura
                (Continued)

FOREIGN PATENT DOCUMENTS

JP    2000-224481 A    8/2000
JP    2004-227470 A    8/2004
            (Continued)

OTHER PUBLICATIONS

May 9, 2017 International Search Report in International Patent Appln. No. PCT/JP2017/003467.
(Continued)

*Primary Examiner* — Jonathan S Lee
(74) *Attorney, Agent, or Firm* — Variable LLP

(57) ABSTRACT

In an embodiment, an image processing apparatus for performing geometrical transformation of data stored in accordance with two-dimensional coordinate positions includes: a control unit configured to decompose a transformation processing from first coordinates to second coordinates into linear transformation and non-linear transformation, the control unit also being configured to determine transformation parameters for the linear transformation and the non-linear transformation; a linear transformation unit configured to perform the linear transformation of the first coordinates to calculate third coordinates; a non-linear transformation unit configured to perform the non-linear transformation of the first coordinates to calculate fourth coordinates; and a combining unit configured to combine the third coordinates and the fourth coordinates to calculate the second coordinates. The control unit determines the transformation parameters so that a third quadrangle formed by the third coordinates becomes a quadrangle approximate to a second quadrangle.

15 Claims, 16 Drawing Sheets

(51) Int. Cl.
*G06T 7/50* (2017.01)
*G06T 3/00* (2006.01)
*G06T 5/50* (2006.01)
*H04N 1/387* (2006.01)
*G06T 3/60* (2006.01)
*G06T 3/20* (2006.01)

(52) U.S. Cl.
CPC ............ *G06T 7/50* (2017.01); *H04N 1/387* (2013.01); *H04N 1/3873* (2013.01); *G06T 3/20* (2013.01); *G06T 3/60* (2013.01); *G06T 2207/20212* (2013.01)

(58) Field of Classification Search
CPC . G06T 3/60; G06T 2207/20212; H04N 1/387; H04N 1/3873
USPC ........................................................ 382/289
See application file for complete search history.

(56) References Cited

U.S. PATENT DOCUMENTS

| | | | |
|---|---|---|---|
| 2005/0259882 A1* | 11/2005 | Dewaele | ................... G06T 7/75 382/243 |
| 2006/0233430 A1 | 10/2006 | Kimura | |
| 2011/0101101 A1* | 5/2011 | Ye | .......................... G06K 7/14 235/462.11 |

FOREIGN PATENT DOCUMENTS

| | | |
|---|---|---|
| JP | 2005-269449 A | 9/2005 |
| JP | 2013-198763 A | 10/2013 |

OTHER PUBLICATIONS

Aug. 27, 2019 Japanese Official Action in Japanese Patent Appln. No. 2016-047605.

* cited by examiner

IMAGE PROCESSING APPARATUS, IMAGE PROCESSING METHOD, AND STORAGE MEDIUM

CROSS-REFERENCE TO RELATED APPLICATIONS

This application is a Continuation of International Patent Application No. PCT/JP2017/003467, filed Jan. 31, 2017, which claims the benefit of Japanese Patent Application No. 2016-047605, filed Mar. 10, 2016, both of which are hereby incorporated by reference herein in their entirety.

BACKGROUND OF THE INVENTION

Field of the Invention

The present invention relates to a technique for performing geometric transformation of data stored in accordance with two-dimensional coordinate positions.

Background Art

Conventionally, devices that handle digital images such as digital cameras, printers, projectors often perform geometric transformation processing on digital images via coordinate transformation. With a printer, for example, enlargement processing of input images (processing for high resolution) is performed in accordance with the print resolution. When shooting, with a monitoring camera, a rectangular object such as a building from a diagonal direction, the object may appear distorted and trapezoidal, and therefore correction of the object appearing trapezoidal to be rectangular (perspective correction), or enlargement processing on a region of interest in the image is performed. With a projector, distortion correction of projected images (keystone correction processing) or the like is performed. In geometric transformation processing, linear coordinate transformation such as enlargement/reduction, rotation, skewing, and translation is referred to as linear transformation, and other coordinate transformation is referred to as non-linear transformation.

Geometric transformation processing is often implemented on hardware for increasing speed. Although linear transformation may be implemented with a relatively small amount of arithmetic operation resources, non-linear transformation requires complicated arithmetic operation such as division, which results in a large circuit scale. Particularly, the value range that the coordinates may take is expanding along with the higher resolution (8K, for example) of images in recent years, and therefore a large-scale arithmetic operation circuit is required in order to realize a highly precise coordinate transformation.

Therefore, Patent Literature 1 first divides a distortion-free image into a plurality of triangular areas, and performs Affine transformation (linear transformation) by calculating the coordinates of points on a distorted image corresponding to vertices of a triangle for each of the divided triangular areas. Accordingly, an approximate transformation is realized for a desired non-linear transformation in the entire image. In addition, Patent Literature 2 realizes non-linear transformation by preliminarily preparing, in a memory of an X-ray diagnosis apparatus, correction tables corresponding to all shooting angles for distortion correction, and setting a correction table corresponding to the current shooting angle to an address generator as necessary.

However, the approach described in Patent Literature 1 requires setting of parameters for Affine transformation for each of the divided triangular areas, complicating the calculation in itself of the parameters. In addition, the approach described in Patent Literature 1 may bring about image deterioration due to inconsistency on borders between the divided triangular areas. Although the approach described in Patent Literature 2 is effective for a device with limited shooting angles such as an X-ray diagnosis apparatus, it is unrealistic to prepare correction tables corresponding to all shooting angles for a device with a high degree of freedom of shooting angles such as generally used cameras.

It is an object of the present invention, which has been made in view of the aforementioned situation, to realize a highly precise geometric transformation with a relatively small amount of arithmetic operation resources.

CITATION LIST

Patent Literature

PTL 1 Japanese Patent Laid-Open No. 2004-227470
PTL 2 Japanese Patent Laid-Open No. 2000-224481

SUMMARY OF THE INVENTION

An image processing apparatus according to an embodiment of the present invention is an image processing apparatus for performing geometrical transformation of data stored in accordance with two-dimensional coordinate positions, including: a control unit configured to decompose a transformation processing from first coordinates to second coordinates into linear transformation and non-linear transformation, the control unit also being configured to determine transformation parameters for the linear transformation and the non-linear transformation; a linear transformation unit configured to perform the linear transformation of the first coordinates to calculate third coordinates; a non-linear transformation unit configured to perform the non-linear transformation of the first coordinates to calculate fourth coordinates; and a combining unit configured to combine the third coordinates and the fourth coordinates to calculate the second coordinates, the control unit determines the transformation parameters so that a third quadrangle formed by the third coordinates becomes a quadrangle approximate to the second quadrangle, and sets the transformation parameters for the linear transformation unit and the non-linear transformation unit, respectively.

Further features of the present invention will become apparent from the following description of exemplary embodiments with reference to the attached drawings.

DESCRIPTION OF THE EMBODIMENTS

Figure 1:
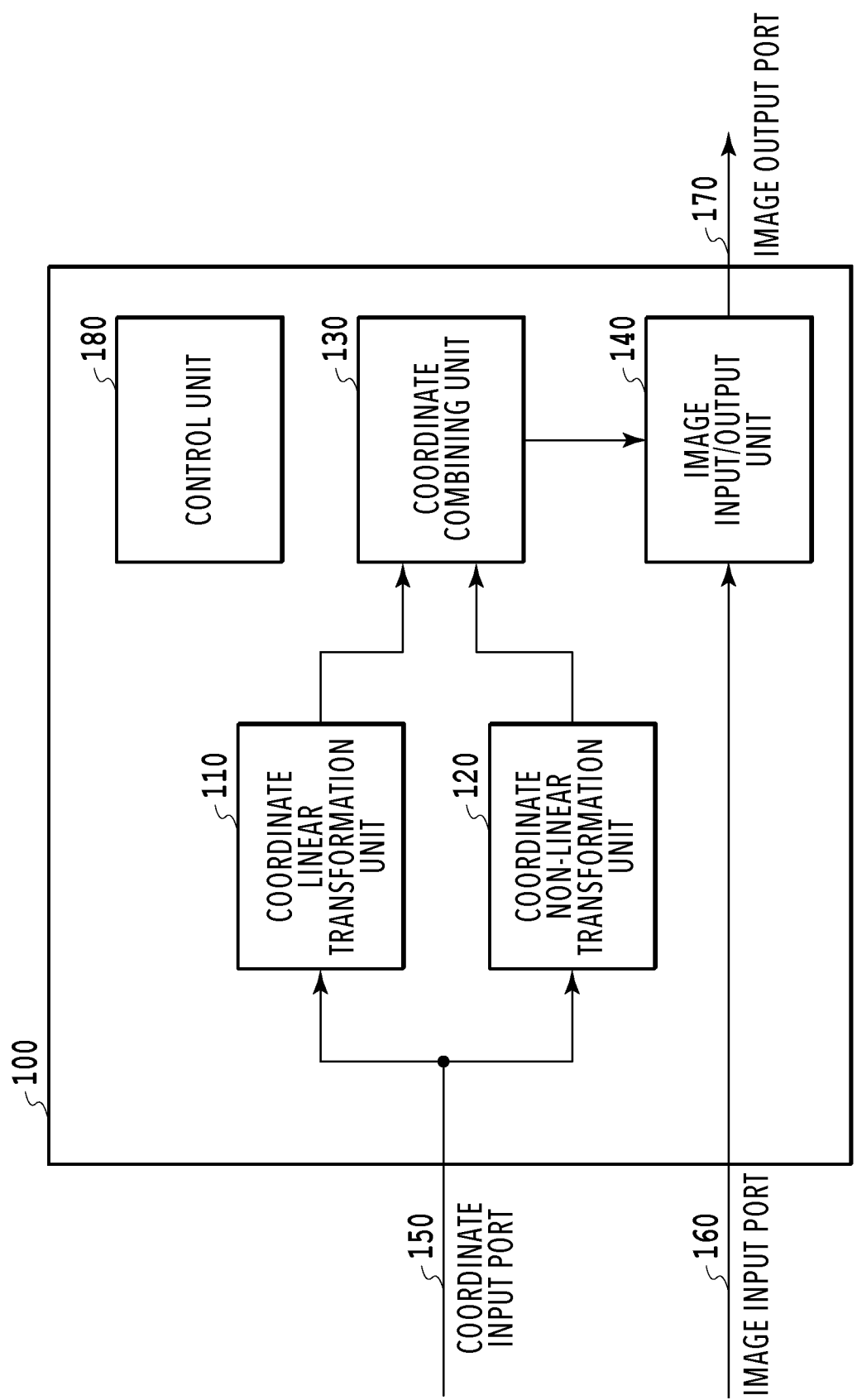
FIG. 1 illustrates an exemplary configuration of an image processing apparatus in embodiment 1.

In the following, an embodiment of the present invention will be described, referring to the drawings. Note that the following embodiments are not intended to limit the present invention relating to the claims. In addition, all of the combination of characteristics described in the following embodiments are not necessarily essential to the present invention.

Embodiment 1

Configuration of Image Processing Apparatus

FIG. 1 illustrates an exemplary configuration of an image processing apparatus 100 in the present embodiment. In the present embodiment, an example of providing streaming output of an image after geometric transformation of an input image stored in a memory will be described. In the present embodiment, coordinates in an image before geometric transformation are calculated from coordinates of respective pixels in an image after geometric transformation, and pixel values corresponding to the calculated coordinates of the image before geometric transformation are calculated from the input image.

The coordinates of the image after geometric transformation are input from a coordinate input port 150 in raster order as first coordinates (Ix, Iy). Here, assuming that the width of the image after geometric transformation includes W pixels and the height includes H pixels, the number of pixels included in the image after geometric transformation turns out to be W pixels×H pixels. The first coordinates (Ix, Iy) are sequentially input, with Iy=0.5 and Ix being incremented by 1 starting from 0.5 until it reaches (W-0.5). Upon Ix reaching (W-0.5), Iy is incremented by 1 and, similarly to the case of Iy=0.5, values of Ix being sequentially incremented are input. The foregoing process is repeated until Iy reaches (H-0.5). Note that the center of gravity of a pixel is used here as its coordinates and therefore (Ix, Iy)=(0.5, 0.5) turns out to be a starting point. A coordinate linear transformation unit 110 and a coordinate non-linear transformation unit 120 respectively perform predetermined linear transformation processing and non-linear transformation processing of the first coordinates (Ix, Iy) input from the coordinate input port 150. In other words, the coordinate linear transformation unit 110 performs linear transformation of the first coordinates (Ix, Iy), and outputs coordinates (Fx, Fy) resulted from the linear transformation. The coordinate non-linear transformation unit 120 performs non-linear transformation of the first coordinates (Ix, Iy), and outputs coordinates (Gx, Gy) resulted from the non-linear transformation. Here, linear transformation refers to linear coordinate transformation such as enlargement/reduction, rotation, skewing, translation, and non-linear transformation refers to transformation other than the foregoing.

A coordinate combining unit 130 combines the coordinates (Fx, Fy) output from the coordinate linear transformation unit 110 as the result of linear transformation and the coordinates (Gx, Gy) output from the coordinate non-linear transformation unit 120 as the result of non-linear transformation, and calculates second coordinates (Hx, Hy). The calculated second coordinates, indicating the position in the input image before geometric transformation, are passed to an image input/output unit 140. Transformation parameters used for linear transformation by the coordinate linear transformation unit 110 and non-linear transformation by the coordinate non-linear transformation unit 120 are respectively determined and set by a control unit 180 (CPU or the like). Details of the setting of transformation parameters will be described below.

The image input/output unit 140, which is capable of accessing an external memory (not illustrated) that temporarily stores the input image, obtains a pixel value located at coordinates (Hx, Hy) in the input image from the external memory via an image input port 160. The obtained pixel value is output to an image output port 170 as the pixel value of the first coordinates (Ix, Iy). Note that the coordinate values Hx, Hy calculated by the coordinate combining unit 130 are not necessarily integers. Therefore, in a case where the coordinate values are not integers, the image input/output unit 140 obtains pixel values of a plurality of pixels in the vicinity of the coordinates (Hx, Hy) in the input image from the external memory, and determines a pixel value corresponding to the coordinates (Hx, Hy) by performing interpolation. The pixel output to the image output port 170 may be further input to other image processing units to be subjected to filtering process or the like, or may be written back, as it is, to the external memory. Components other than the control unit 180 are implemented as hardware (circuits).

Example of Geometric Transformation

Figure 2A:
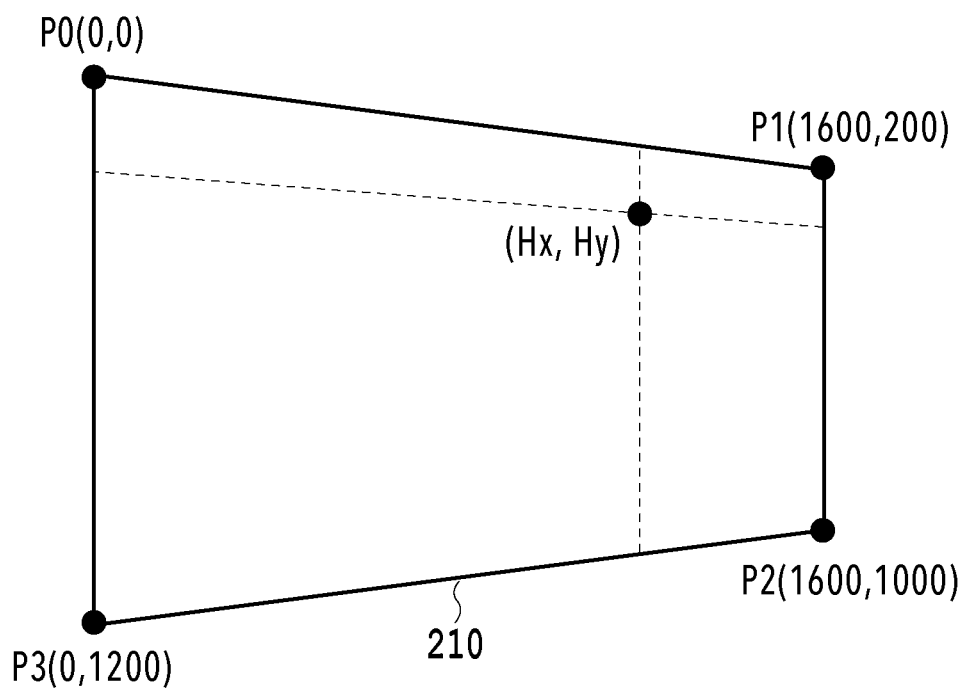
FIG. 2A illustrates an exemplary geometric transformation in embodiment 1.
Figure 2B:
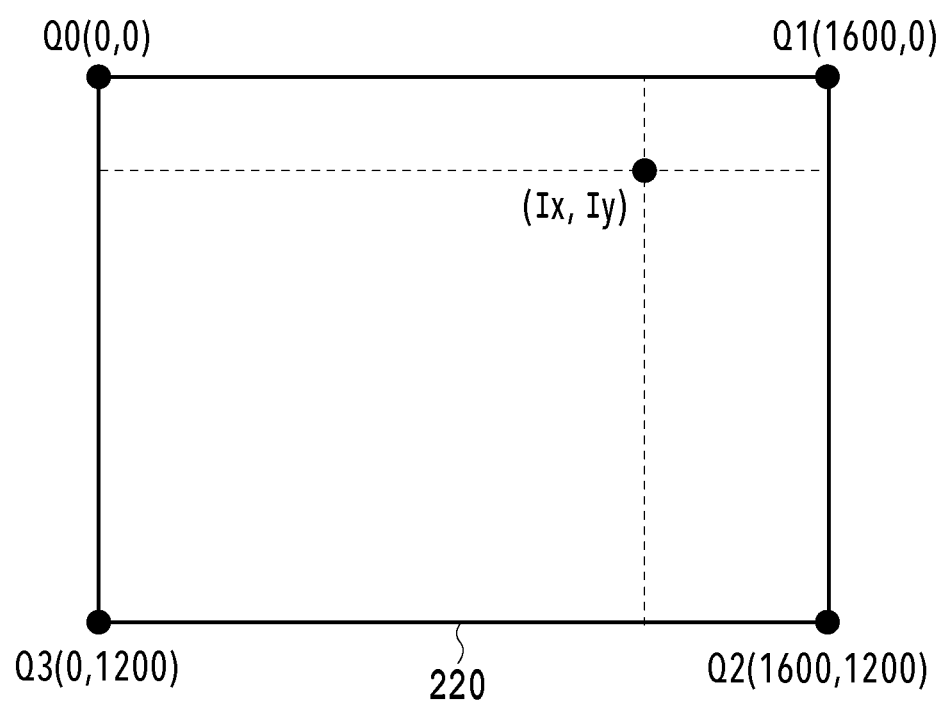
FIG. 2B illustrates an exemplary geometric transformation in embodiment 1.

In the present embodiment, an exemplary perspective correction (tilt correction) will be described as an operative example of geometric transformation. FIGS. 2A and 2B illustrate an exemplary perspective correction in the present embodiment. FIG. 2A illustrates a quadrangle before perspective correction, and FIG. 2B illustrates a quadrangle after perspective correction. A quadrangle 210 before perspective correction is a trapezoid, with the coordinates of its four vertices respectively assumed to be (0, 0), (1600, 200), (1600, 1000) and (0, 1200). A quadrangle 220 after perspective correction is a rectangle, with the coordinates of its four vertices respectively assumed to be (0, 0), (1600, 0), (1600, 1200) and (0, 1200). In a case where an imaging device such as a digital camera shoots an object along an inclined optical axis, the object appears distorted in the captured image, as illustrated in FIG. 2A. Therefore, performing perspective correction on the captured image transforms the captured image into an image appearing as though the object has been shot from the front in parallel with the optical axis, as illustrated in FIG. 2B. Although the captured image to be corrected is in itself a set of data of pixel values stored for respective pixels and thus a quadrangle, an image with reduced distortion may be obtained by transforming the quadrangle such as that illustrated in FIG. 2A, which is a partial region of the captured image, into a quadrangle illustrated in FIG. 2B. The type of perspective correction to be performed on the captured image to be processed is determined by the mode of the imaging device or the user's specification at the time of shooting.

In the present embodiment, image data to be corrected is stored in an external memory. The coordinate input port 150 illustrated in FIG. 1 receives input of coordinates of the after-correction quadrangle 220 in raster-order. In other words, the coordinates of the after-correction quadrangle 220 are input as the first coordinates (Ix, Iy), and the coordinates of the before-correction quadrangle 210 corresponding thereto are calculated as the second coordinates (Hx, Hy). In the present embodiment, non-linear coordinate transformation from the first coordinates (Ix, Iy) to the second coordinates (Hx, Hy) is decomposed into linear components and non-linear components, and the coordinate linear transformation unit 110 and the coordinate non-linear transformation unit 120 respectively perform linear transformation and non-linear transformation of the first coordinates (Ix, Iy). Subsequently, the second coordinates (Hx, Hy) are calculated by combining, by the coordinate combining unit 130, the obtained results of linear transformation and non-linear transformation.

Coordinate Transformation Processing

Figure 3:
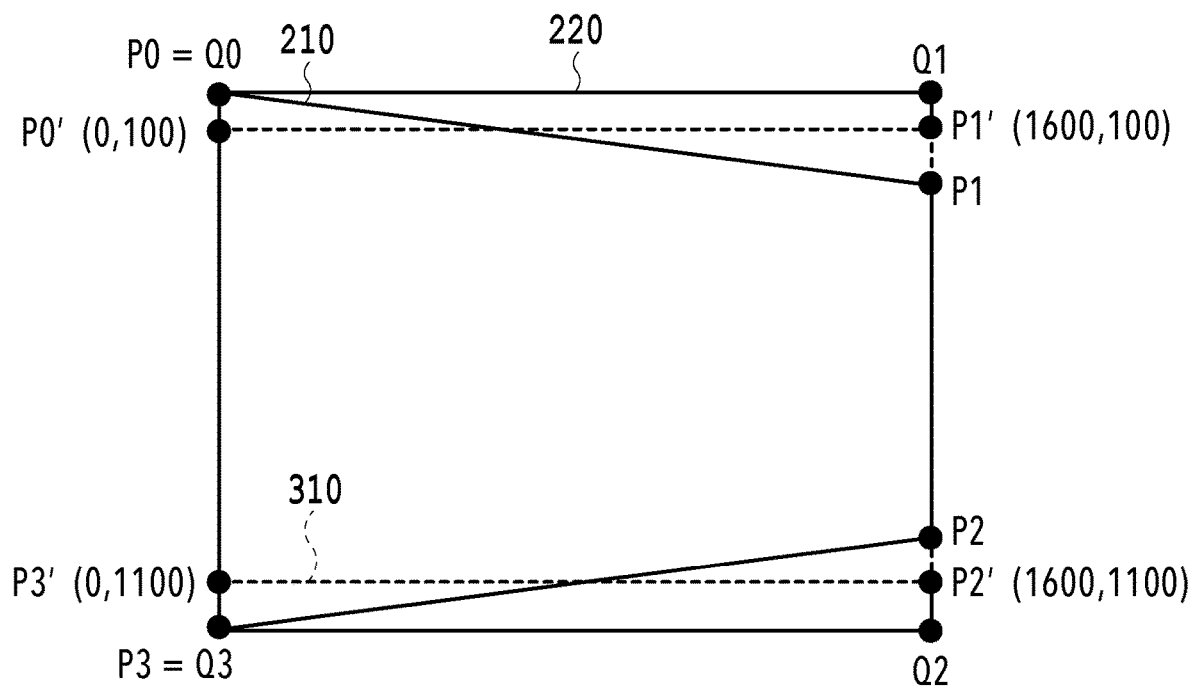
FIG. 3 is an explanatory diagram of an intermediate quadrangle in embodiment 1.

FIG. 3 is an explanatory diagram of a method that realizes coordinate transformation by linear transformation and non-linear transformation, in the present embodiment. In order to decompose coordinate transformation into linear transformation and non-linear transformation, the control unit 180 at first sets a quadrangle 310 defined by P0', P1', P2' and P3' as intermediate data (referred to as intermediate quadrangle in the following), as illustrated in FIG. 3. The control unit 180 determines the intermediate quadrangle 310 on the basis of the before-perspective-correction quadrangle 210 defined by points P0, P1, P2, and P3, and an after-perspective-correction quadrangle 320 defined by points Q0, Q1, Q2 and Q3. Linear transformation processing performs transformation from the after-perspective-correction quadrangle to the intermediate quadrangle, and non-linear transformation processing performs transformation from the intermediate quadrangle to the before-perspective-correction quadrangle. It is desirable that linear transformation processing performs the main transformation processing so as to reduce arithmetic operation required for non-linear transformation processing. Accordingly, the control unit 180 calculates, from the quadrangle 220 formed by the first coordinates, the intermediate quadrangle as a quadrangle existing within the range of linear transformation and being similar to the shape of the quadrangle 210 (P0/P1/P2/P3) formed by the second coordinates. The intermediate quadrangle 310 is formed by the result of the linear transformation of the coordinate linear transformation unit 110.

Figure 4:
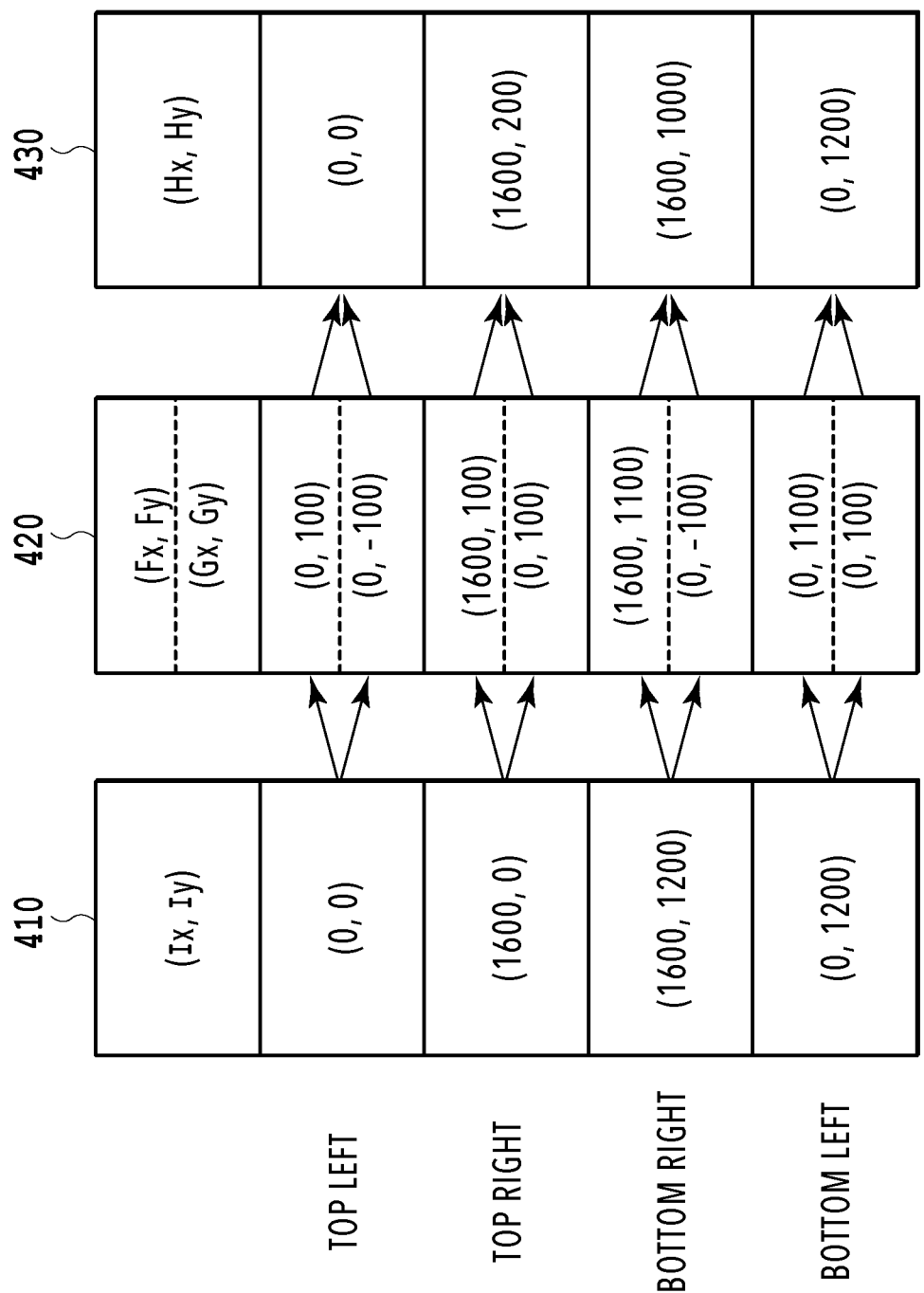
FIG. 4 illustrates an exemplary coordinate transformation of four vertices of the quadrangle in embodiment 1.

FIG. 4 illustrates an exemplary coordinate transformation of four vertices of a quadrangle. In FIG. 4, a column 410 indicates the first coordinates which are coordinates of the four vertices of the after-correction quadrangle 220. A column 430 indicates the second coordinates which are coordinates of the four vertices of the before-correction quadrangle 210. A column 420 indicates, at the upper part thereof, the result of the linear transformation with regard to respective coordinates of the column 410, and the result of non-linear transformation at the lower part thereof. The sum of the coordinates of the upper part and the lower part turns out to be the coordinates of the four vertices of the before-correction quadrangle 210 indicated by the column 430. In other words, non-linear transformation from the first coordinates (Ix, Iy) to the second coordinates (Hx, Hy) is decomposed into two parts, namely, linear transformation from the first coordinates (Ix, Iy) to the after-linear-transformation coordinates (Fx, Fy) and non-linear transformation from the first coordinates (Ix, Iy) to the after-non-linear-transformation coordinates (Gx, Gy).

In the following, configurations of the coordinate linear transformation unit 110 and the coordinate non-linear transformation unit 120 that realize the aforementioned transformation will be described in detail. Here, the coordinate linear transformation unit 110 uses Affine transformation, which is a representative linear transformation. A transformation which is expressible by Affine transformation is defined as linear transformation, and a transformation which is inexpressible by Affine transformation is defined as non-linear transformation. The coordinate linear transformation unit 110 is assumed to be a circuit including resources capable of calculating the Affine transformation function represented by Formula (1).

$$\begin{bmatrix} Fx \\ Fy \end{bmatrix} = \begin{bmatrix} a & b \\ c & d \end{bmatrix} \cdot \begin{bmatrix} Ix \\ Iy \end{bmatrix} + \begin{bmatrix} e \\ f \end{bmatrix} \qquad \text{Formula (1)}$$

Here, Affine coefficients a, b, c, d, e and f are transformation parameters set by the control unit 180. In order to obtain the intermediate quadrangle 310 illustrated in FIG. 3, desired linear transformation may be realized by a setting such as a=1.0, b=0.0, c=0.0, d=0.833, e=0.0, and f=100.0.

The coordinate non-linear transformation unit 120 realizes non-linear transformation by UV mapping using bi-linear interpolation on the basis of the UV values of the four vertices of the quadrangle. The non-linear transformation function of this case is represented by Formula (2).

$$\begin{bmatrix} Gx \\ Gy \end{bmatrix} = \begin{bmatrix} U0 & U1 & U2 & U3 \\ V0 & V1 & V2 & V3 \end{bmatrix} \cdot \begin{bmatrix} (1-\alpha)(1-\beta) \\ \alpha(1-\beta) \\ \alpha\beta \\ (1-\alpha)\beta \end{bmatrix} \qquad \text{Formula (2)}$$

$$\alpha = \frac{Ix}{W}, \beta = \frac{Iy}{H}$$

Here, parameters (U0, V0), (U1, V1), (U2, V2) and (U3, V3) are coordinates in a case where the coordinates (0, 0), (W, 0), (W, H) and (0, H) of the four vertices to be the first coordinates are subjected to non-linear transformation. The parameters (U0, V0), (U1, V1), (U2, V2) and (U3, V3) are transformation parameters respectively set by the control unit 180. In the present embodiment, since the first coordinates (the column 410) are transformed into a difference (lower part of the column 420) by non-linear transformation as illustrated in FIG. 4, the control unit 180 may realize the desired non-linear transformation by setting the UV values of the four vertices of the quadrangle as follows. Specifically, the parameters are respectively set such as (U0, V0)=(0.0, −100.0), (U1, V1)=(0.0, 100.0), (U2, V2)=(0.0, −100.0) and (U3, V3)=(0.0, 100.0). In addition, although W=1600, H=1200 are set in the present embodiment, they are not limiting, and W and H may be limited to powers of 2 such as 1024, 4096 or the like so as to realize division by shift operation.

The coordinate combining unit 130 adds the coordinates (Fx, Fy) resulted from the linear transformation by Formula (1) and the coordinates (Gx, Gy) resulted from the non-linear transformation by Formula (2) as represented by Formula (3).

$$\begin{bmatrix} Hx \\ Hy \end{bmatrix} = \begin{bmatrix} Fx \\ Fy \end{bmatrix} + \begin{bmatrix} Gx \\ Gy \end{bmatrix} \quad \text{Formula (3)}$$

Next, the arithmetic precision of coordinate transformation will be described. As has been described above, the control unit 180 sets the after-linear-transformation coordinates (Fx, Fy) to be obtained by linear transformation to values as close to the second coordinates (Hx, Hy) as possible. As a result, the range (value range) that may be taken by the absolute values of the after-non-linear transformation coordinates (Gx, Gy), which is the difference therebetween, may be narrowed in comparison with the after-linear-transformation coordinates (Fx, Fy). For example, in the aforementioned exemplary perspective correction, the absolute value of the after-linear-transformation coordinates (Fx, Fy) turns out to be 10 times or more of the absolute value of the after-non-linear-transformation coordinates (Gx, Gy), as illustrated in FIG. 4. Considering that the arithmetic operation error is proportional to the absolute value of arithmetic operation result, the error included in the second coordinates (Hx, Hy) is dominantly influenced by the error originating from the coordinate linear transformation unit 110. Therefore, a highly precise coordinate transformation may be realized by setting a higher arithmetic precision of the coordinate linear transformation unit 110 than the arithmetic precision of the coordinate non-linear transformation unit 120. Here, the arithmetic precision may be the number of bits after the decimal point in the case of the fixed decimal point, or may be the number of bits of the mantissa in the case of floating decimal point.

Setting of Transformation Parameters

Figure 9A:
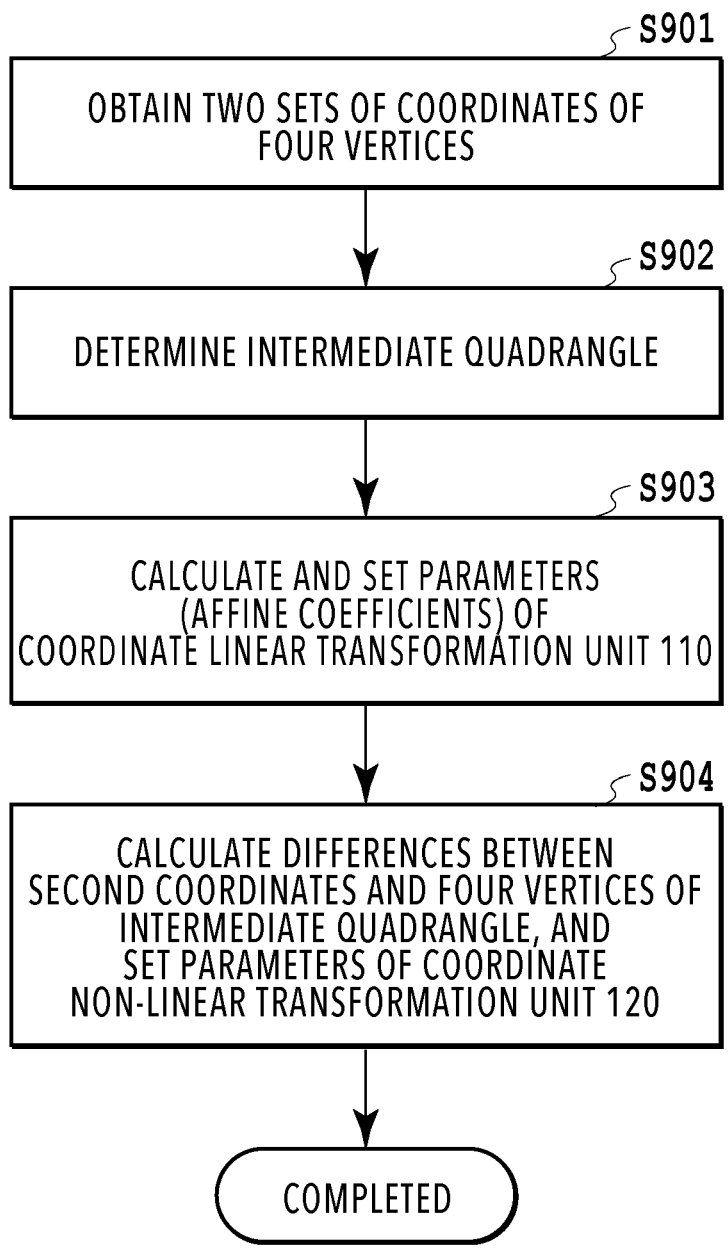
FIG. 9A is a flowchart of transformation parameter calculation in embodiment 1.
Figure 9B:
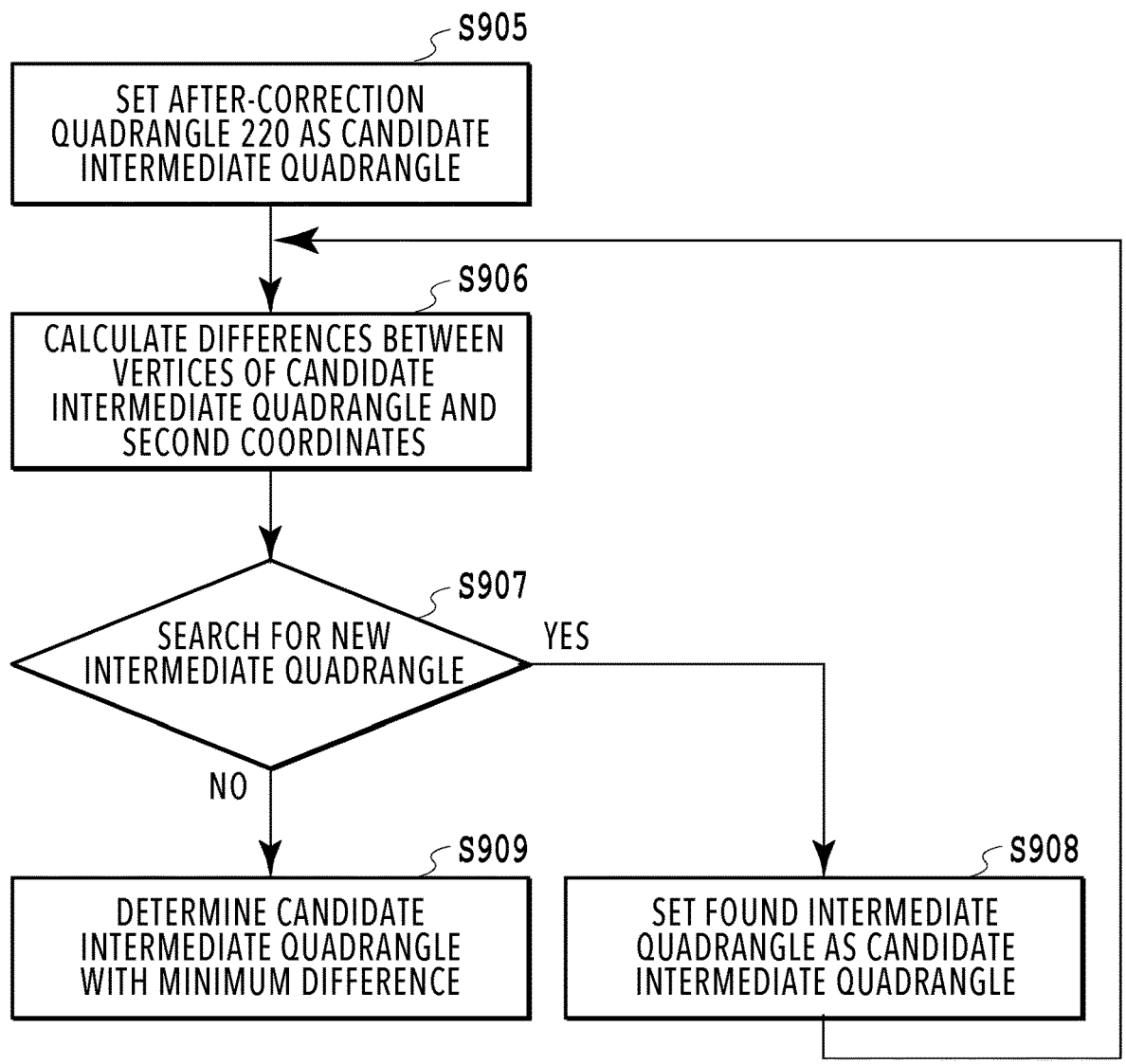
FIG. 9B is a flowchart of the transformation parameter calculation in embodiment 1.
Figure 9C:
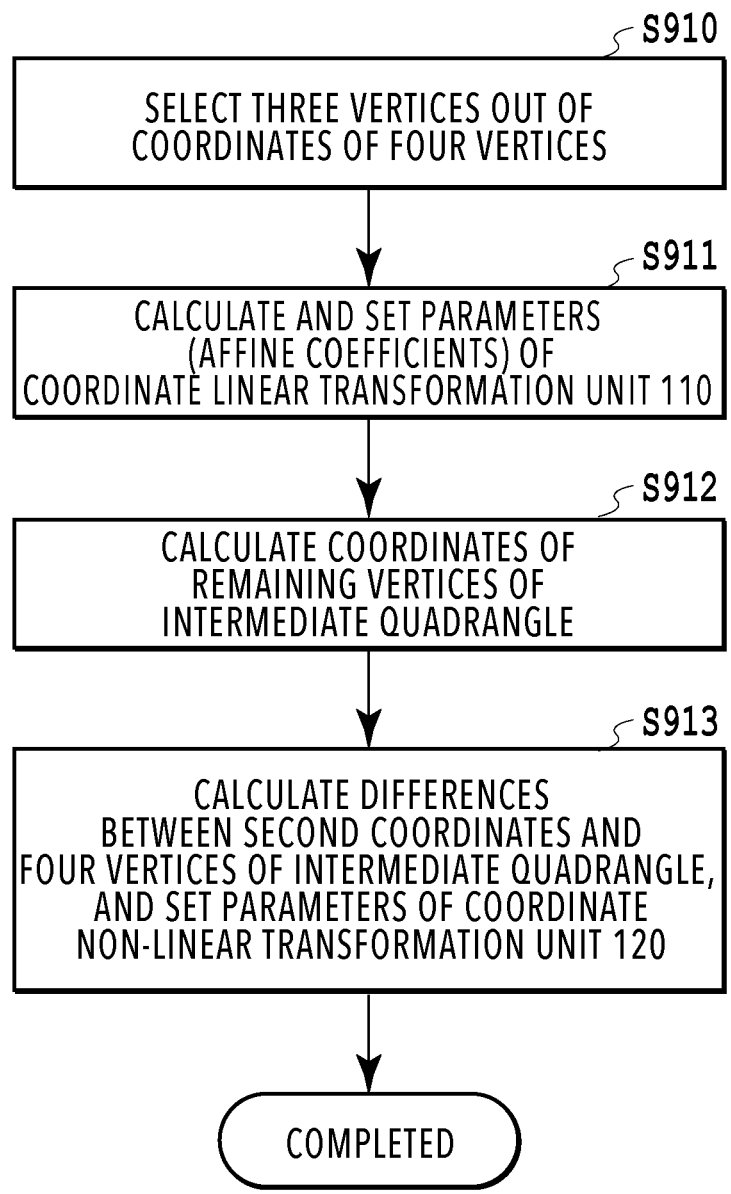
FIG. 9C is a flowchart of the transformation parameter calculation in embodiment 1.

The control unit 180 decomposes coordinate transformation processing into linear transformation and non-linear transformation on the basis of the obtained coordinates of the four vertices. FIGS. 9A to 9C are flowcharts of a process performed by the control unit 180. The control unit 180, which is a CPU, realizes the following processing by reading and executing a program, from a ROM (not illustrated), which is capable of realizing the flowchart illustrated in FIGS. 9A to 9C.

First, at step S901 illustrated in FIG. 9A, the control unit 180 obtains the four vertices defining the before-perspective-correction quadrangle and the four vertices defining the after-perspective-correction quadrangle. Here, it is assumed that a construction, which is the main object, is detected from the image to be corrected, and the four vertices of the construction are corrected to form a distortion-free image. Accordingly, the control unit 180 obtains the coordinates of the four vertices of the construction, which is the object, as the four vertices defining the before-perspective-correction quadrangle. In addition, the four vertices after perspective correction are preliminarily determined on the basis of the shooting mode, user specification, image of to be corrected, or the like.

At step S902, the control unit 180 determines the intermediate quadrangle from the two sets of four vertices obtained at step S901. FIG. 9B is a more detailed flowchart of the processing at step S902. First, at step S905, the control unit 180 sets the vertices Q0 to Q3 of the after-perspective-correction quadrangle as the initial values of a candidate intermediate quadrangle. Next, at step S906, the control unit 180 calculates the differences between respective coordinates of the candidate intermediate quadrangle and the respective vertices P0 to P3 of the before-perspective-correction quadrangle. On this occasion, the vertices between which differences are calculated are vertices located at positions closest to each other.

Next, at step S907, the control unit 180 searches for a quadrangle to be the next candidate intermediate quadrangle. Specifically, the control unit 180 performs an operation to move the X coordinate or the Y coordinate of at least one vertex of the current candidate intermediate quadrangle closer to the vertex of the corresponding before-correction quadrangle step by step. On this occasion, the operation is performed within the range of linear transformation. Upon finding a new intermediate quadrangle on which such an operation is possible, the processing proceeds to step S908. At step S908, the newly found intermediate quadrangle is set as the next candidate intermediate quadrangle, and the processing returns to step S906. In a case where there is not any new candidate intermediate quadrangle, it is assumed that differences for all the candidate intermediate quadrangles have been calculated, and the processing proceeds to step S909. Upon calculating the differences with the vertices P0 to P3 of the before-perspective-correction quadrangle for all the candidate intermediate quadrangles, the control unit 180 determines the candidate intermediate quadrangle with the minimum difference to be the intermediate quadrangle at step S909. In the example of FIG. 3, the coordinates of the four vertices of the intermediate quadrangle 310 turn out to be (0, 100), (1600, 100), (1600, 1100) and (0, 1100).

Returning to FIG. 9A, the control unit 180 calculates, at step S903, the Affine coefficients a, b, c, d, e and f, which are parameters used in the linear transformation processing on the basis of Formula (1) and the coordinates of the intermediate quadrangle, and sets the calculated parameters to the coordinate linear transformation unit 110.

At step S904, the control unit 180 calculates the parameter used for non-linear transformation processing on the basis of the coordinates of the four vertices before perspective correction and the coordinates of the intermediate quadrangle, and sets the calculated parameter to the coordinate non-linear transformation unit 120. The coordinate non-linear transformation unit 120 performs transformation processing up to the intermediate quadrangle 310 formed by the result of the linear transformation and the quadrangle 210 formed by the second coordinates. Here, the control unit 180 calculates the parameters from the differences between the intermediate quadrangle 310 formed by the result of the linear transformation and the quadrangle 210 formed by the second coordinates. In the example of FIG. 3, the differences between the coordinates of the four vertices of the intermediate quadrangle 310 and the coordinates of the four vertices of the quadrangle 210 turn out to be (P0−P0'), (P1−P1'), (P2−P2') and (P3−P3'). Each of the differences is substituted into (U0, V0), (U2, V2), (U1, V1) and (U3, V3) of Formula (2) so as to calculate the parameters.

As has been described above, decomposition of transformation processing by the control unit 180 is completed. The control unit 180 sets, as described above, the result of decomposition (transformation parameters) calculated before starting the coordinate transformation processing to the coordinate linear transformation unit 110 and the coordinate non-linear transformation unit 120, respectively. As has been described above, the smaller the absolute values of the coordinates (Gx, Gy) of the result of non-linear transformation, the more desirable in terms of precision. In the present embodiment, therefore, an intermediate quadrangle has been obtained which gives the minimum absolute value sum (|P0−P0'|+|P1−P1'|+|P2−P2'|+|P3−P3'|) of the distances between the four vertices of the intermediate quadrangle and the four vertices of the quadrangle 210 which is the final result of arithmetic operation.

Effect of Embodiment 1

Next, arithmetic operation resources for realizing the coordinate transformation processing will be described. Generally, realizing non-linear transformation with a single unit requires a larger circuit scale for a higher precision since non-linear transformation includes complicated arithmetic operation such as division. Since there is little effect in decreasing the precision of non-linear transformation with the configuration of the present embodiment, it is possible to realize non-linear transformation with a relatively small circuit scale. Note that the present embodiment has been described taking as an example a case where the coordinate linear transformation unit 110, the coordinate non-linear transformation unit 120, the coordinate combining unit 130, and the image input/output unit 140 are respectively realized as circuits. However, a similar arithmetic operation may be effective in a case where the units are implemented as programs instead of hardware. In a case where the arithmetic operation cost is high when performing complicated arithmetic operation for coordinate transformation with a high precision, there may arise an unfavorable situation such as increase of arithmetic operation delay or increase of power consumption. Therefore, application of the present embodiment allows for reducing the arithmetic operation cost and improving the aforementioned situation.

As has been described above, the aforementioned embodiment provides a configuration that, after having decomposed a desired coordinate transformation processing into two transformations and having transformed respective coordinates independently, combines the both results. The two transformations are intended to have different arithmetic operation precision, value range of arithmetic operation result, arithmetic operation function (Formula (1) and Formula (2)). Accordingly, both the precision of the final result of arithmetic operation and the circuit scale have been achieved.

Exemplary Variation 1

Although there has been described an example of providing streaming output of an image after having performed geometric transformation on an input image stored in the memory with embodiment 1, this is not limiting. Conversely, for example, an image after having performed geometric transformation on an image provided by streaming input may be written to the memory. Generally, in a case where either one of the input image or the output image is for streaming (in raster-order) and the other is randomly accessed, it suffices to provide a configuration that coordinates at the streaming side are input from the coordinate input port 150 and randomly accessed on the basis of the result of having transformed the coordinates.

In the present variation, there will be described a case where pixels of the input image are input from the image input port 160 in raster order. Although the coordinates of the output image are input to the coordinate input port 150 as the first coordinates in the aforementioned embodiment 1, the coordinates of the input image are input as the first coordinates in the present variation. In this case, the second coordinates to be calculated turn out to be the coordinates of the output image, and passed to the image input/output unit 140. Subsequently, the image input/output unit 140 writes pixels of the input image to the memory addresses corresponding to the coordinates of the output image which has been passed thereto. Note that the image input/output unit 140 may include a line buffer that temporarily stores an image across several lines.

Embodiment 2

Figure 5A:
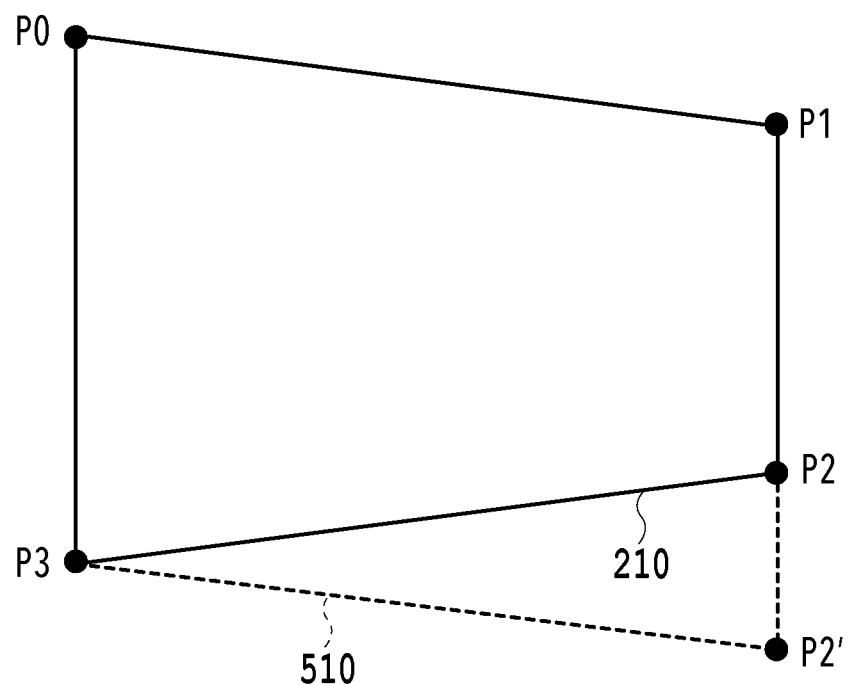
FIG. 5A is an explanatory diagram of a decomposition method of the coordinate transformation processing in embodiment 1.

In embodiment 1, the control unit 180 calculates differences with four vertices before perspective correction for all the candidate intermediate quadrangles, and determines the candidate with the minimum difference to be the intermediate quadrangle. In embodiment 2, there is described a method in which the control unit 180 uses three vertices out of the four vertices before perspective correction to decompose the coordinate transformation processing so that the absolute values of the coordinates (Gx, Gy) of the result of non-linear transformation become smaller. FIG. 5A is an explanatory diagram of a decomposition method of coordinate transformation processing in the present embodiment. Generally, coordinate transformation processing that adjusts arbitrary three points within the range of linear transformation is possible. The control unit 180 therefore calculates, as the intermediate quadrangle, a quadrangle that results from linear transformation in a manner adjusting three points (P0, P1, P3) out of the four vertices of the quadrangle 210 formed by the second coordinates. In embodiment 2, therefore, three points (Q0, Q1, Q3) out of the four vertices of the quadrangle 220 formed by the first coordinates are linearly transformed into an intermediate quadrangle 510 adjusted to the three points (P0, P1, P3) out of the four vertices of the quadrangle 210 formed by the second coordinates. The four vertices of the intermediate quadrangle 510 turn out to be P0, P1, P2' and P3.

FIG. 9C is a flowchart of the processing performed by the control unit 180 in embodiment 2. First, at step S910, the control unit 180 obtains the four vertices of the quadrangle 210 formed by the second coordinates, and selects three arbitrary vertices (here, P0, P1 and P3) out of the four vertices obtained.

At step S911, the control unit 180 calculates Affine coefficients by solving an equation obtained by substituting the coordinates of the three points Q0, Q1 and Q3, and the coordinates of the three points P0, P1 and P3 respectively into (Ix, Iy) and (Fx, Fy) of Formula (1). The control unit 180 sets the calculated Affine coefficients to the coordinate linear transformation unit 110. Next, at step S912, the control unit 180 also calculates the coordinates of the remaining one point (P2') of the intermediate quadrangle 510 using the calculated Affine coefficients.

At step S913, the control unit 180 calculates transformation parameters of the coordinate non-linear transformation unit 120 ((U0, V0), (U1, V1), (U2, V2) and (U3, V3) in Formula (2) expressing the non-linear transformation function) on the basis of the coordinates of P2' and P2, and sets the parameters to the coordinate non-linear transformation unit 120. Specifically, it suffices to set the coordinates of (P2-P2') to (U2, V2) of Formula (2), and set (0.0, 0.0) to (U0, V0), (U1, V1) and (U3, V3) of Formula (2). As has been described above, decomposition of the coordinate transformation processing in embodiment 2 is completed. In this case, since only one point is adjusted (P2 to P2') by non-linear transformation, it turns out to be a method with a relatively small amount of computation (i.e., load of the control unit 180) of decomposition in itself.

Figure 5B:
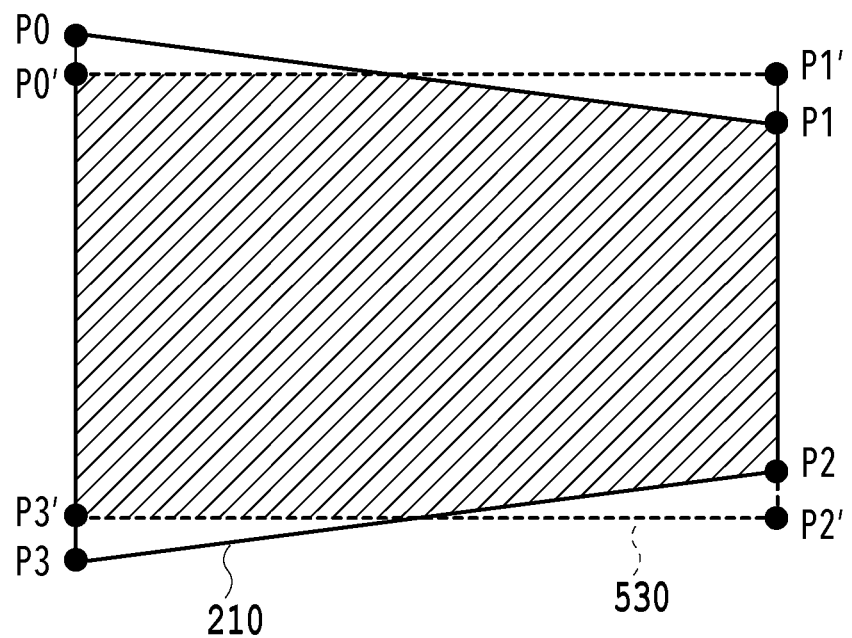
FIG. 5B is an explanatory diagram of the decomposition method of the coordinate transformation processing in embodiment 1.

Note that another decomposition method is also possible. In FIG. 5B, focusing on an overlapping region (the part with diagonal lines), there is obtained an intermediate quadrangle 530 with the largest (or approximately largest) proportion, relative to the total area of intermediate quadrangles, of the region overlapping with the quadrangle 210 resulted from the final arithmetic operation.

The aforementioned intermediate quadrangles 510 and 530 are both within the range of linear transformation from the quadrangle 220 illustrated in FIG. 2B. Therefore, it is possible to calculate coordinates as the result from linear transformation by appropriately setting transformation parameters to the coordinate linear transformation unit 110. The coordinate non-linear transformation unit 120 has transformation parameters set thereto so as to calculate, as the result of non-linear transformation, only the difference between the quadrangle 210 resulted from the final arithmetic operation and the intermediate quadrangle. In both cases of intermediate quadrangles, the absolute value of the difference is expected to be relatively small. Note that the decomposition method is not limited to the examples described above, and coordinate transformation may be performed using transformation parameters calculated by other methods.

Exemplary Variation 2

Although it is assumed in embodiment 1 described above that the coordinate linear transformation unit 110 performs Affine transformation and the coordinate non-linear transformation unit 120 performs mapping of UV values by bi-linear interpolation, other types of arithmetic operation may be used. For example, the coordinate linear transformation unit 110 may only perform simple enlargement/reduction. In this case, Formula (4) is executed as linear transformation.

$$\begin{bmatrix} Fx \\ Fy \end{bmatrix} = a \begin{bmatrix} Ix \\ Iy \end{bmatrix} \quad \text{Formula (4)}$$

Here, "a" is a parameter representing the enlargement/reduction rate. Even this case is sufficient for use cases without rotation or translation, whereby it is possible to further reduce the circuit scale.

In addition, for example, the coordinate non-linear transformation unit 120 may also perform UV mapping taking the depth into account. In this case, Formula (5) is executed as non-linear transformation.

$$\begin{bmatrix} Gx \\ Gy \end{bmatrix} = \frac{1}{\frac{(1-\alpha)(1-\beta)}{Z_0} + \frac{\alpha(1-\beta)}{Z_1} + \frac{\alpha\beta}{Z_2} + \frac{(1-\alpha)\beta}{Z_3}} \quad \text{Formula (5)}$$

-continued $$\begin{bmatrix} U0 & U1 & U2 & U3 \\ V0 & V1 & V2 & V3 \end{bmatrix} \cdot \begin{bmatrix} (1-\alpha)(1-\beta)/Z0 \\ \alpha(1-\beta)/Z1 \\ \alpha\beta/Z2 \\ (1-\alpha)\beta/Z3 \end{bmatrix}$$

Here, Z0, Z1, Z2 and Z3 are respectively the depths (coordinates in the depth direction) of the four vertices, the other parameters being equivalent to those of Formula (2). Although the foregoing approach allows for a more accurate mapping of UV values, the arithmetic operation becomes more complicated due to increase of division, or the like. However, the coordinate non-linear transformation unit 120 has only a negligible effect on the final result, despite its precision is lower than the coordinate linear transformation unit 110, due to the configuration described in embodiment 1, and therefore it is possible to implement a complicated arithmetic operation with a relatively small circuit scale.

Embodiment 3

Figure 6:
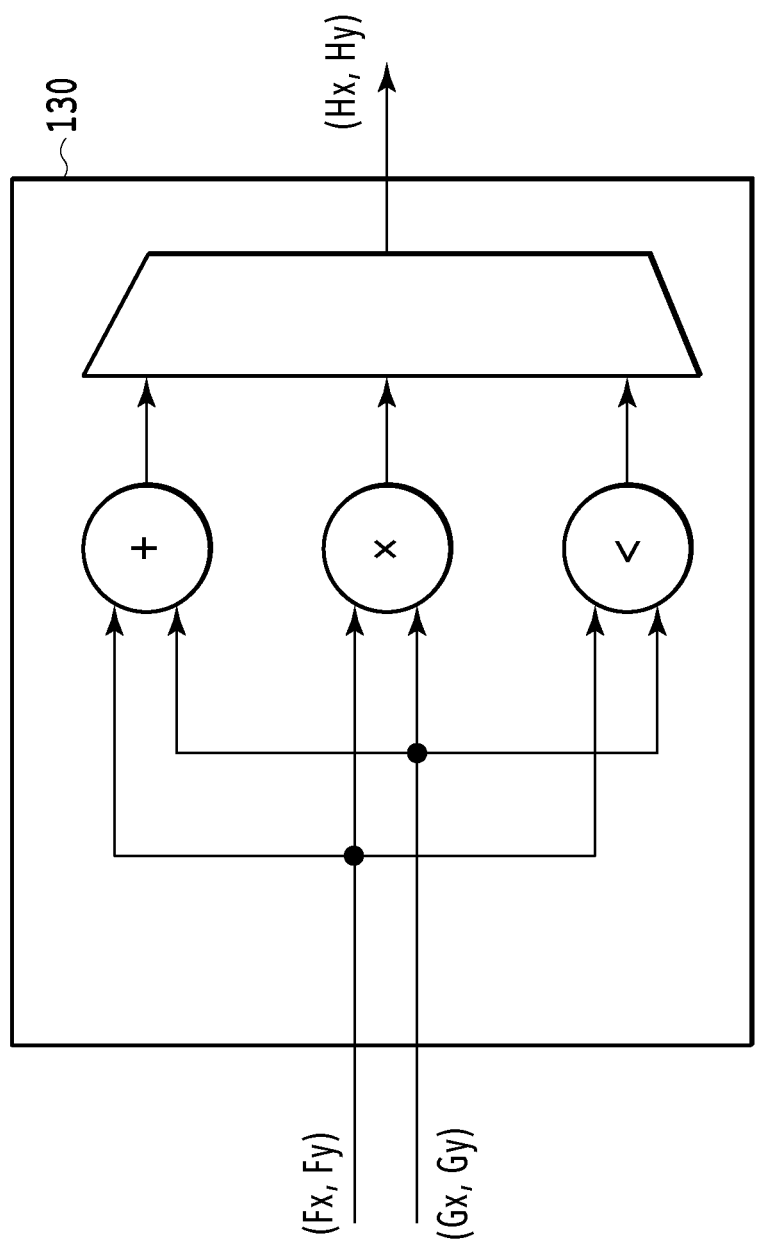
FIG. 6 illustrates an exemplary configuration of a coordinate combining unit in embodiment 2.

Although the coordinate combining unit 130 in embodiment 1 performs addition of the results of linear transformation (Fx, Fy) and non-linear transformation (Gx, Gy), other types of arithmetic operation may be performed. The coordinate combining unit 130 may be configured to be capable of performing multiplication or comparison (selecting the larger one), for example. FIG. 6 illustrates an exemplary configuration of the coordinate combining unit 130 of such a case. As illustrated in FIG. 6, the coordinate combining unit 130 is configured to output the result of one of addition, multiplication, or comparison to the results of linear transformation (Fx, Fy) and non-linear transformation result (Gx, Gy), which are the inputs. Selection of arithmetic operation is controlled by the control unit 180. Such a configuration allows for realizing a variety of coordinate transformation.

Figure 7:
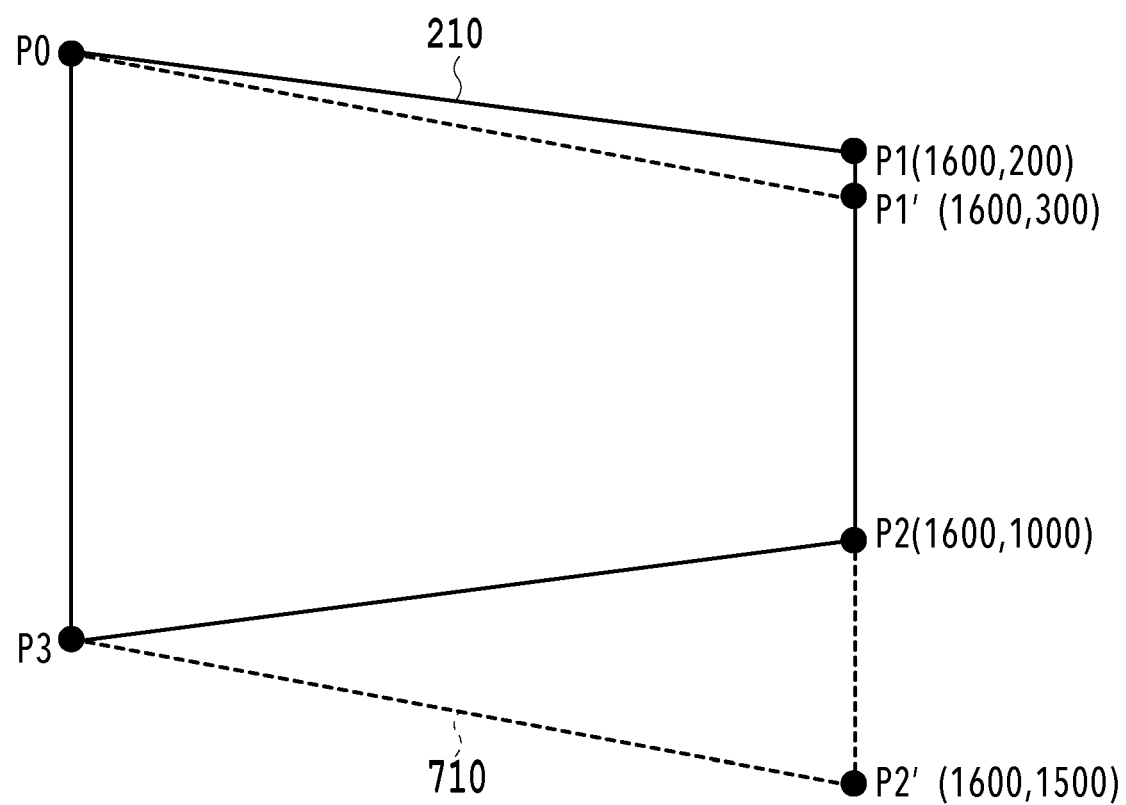
FIG. 7 is an explanatory diagram of a decomposition method of the coordinate transformation processing in embodiment 2.

For example, there is described an example of decomposing the transformation processing from the coordinates of the quadrangle 220 to the coordinates of the quadrangle 210 illustrated in FIGS. 2A and 2B into multiplication of linear transformation and non-linear transformation. The decomposition may be realized using the intermediate quadrangle 710 illustrated in FIG. 7, for example. In other words, the coordinate linear transformation unit 110 calculates the coordinates of intermediate quadrangle 710, and the coordinate non-linear transformation unit 120 performs non-linear transformation so that the coordinates of the four vertices turn out to be (1.0, 1.0), (1.0, 0.67), (1.0, 0.67) and (1.0, 1.0). The coordinate combining unit 130 multiplies the results of linear transformation and non-linear transformation. The foregoing approach realizes a deformation such that the intermediate quadrangle 710, with its left edge (P0, P3) being the same in size, gradually shrinks in the Y-direction as shifted rightward, and turns out to be ⅔ in size in the Y-direction at its right edge (P1', P2'). In the foregoing manner, it is possible to realize a desired coordinate transformation by multiplication of linear transformation and non-linear transformation.

Embodiment 4

Figure 8:
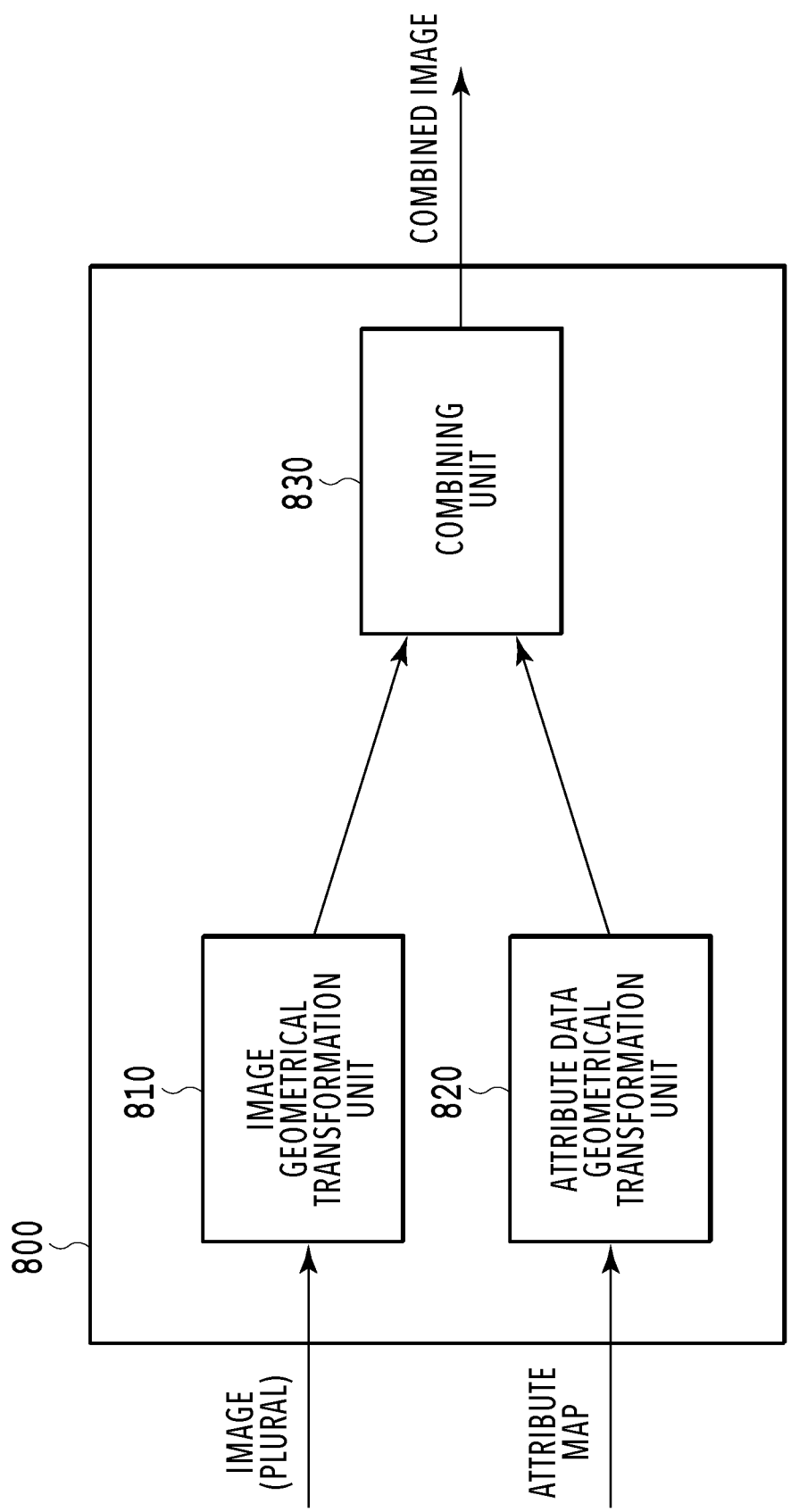
FIG. 8 illustrates an exemplary configuration of an image processing apparatus in embodiment 3.

In the present embodiment, there is described an example of applying the geometric transformation described in the aforementioned embodiment to image combination processing. FIG. 8 illustrates an exemplary configuration of an image processing apparatus 800 in the present embodiment. An image geometrical transformation unit 810 reads a plurality of images (frames) forming a video image from a memory (not illustrated) and, after having performed a predetermined geometric transformation processing, sequentially supplies the images to a combining unit 830. An attribute data geometrical transformation unit 820 reads attribute maps from a memory (not illustrated) and, after having performed a predetermined geometric transformation processing, sequentially supplies the maps to the combining unit 830. Here, an attribute map, having stored therein attribute data (metadata) calculated by analysis processing for each divided region of an image in accordance with two-dimensional coordinate positions of the divided region, is a type of data recording the amount of movement between frames, for example. The combining unit 830 sequentially performs combination processing for each pixel and outputs the result of combination. When performing combination processing, the parameters to be processed are changed in an adaptive manner in accordance with the attribute data. The image combination processing, which is for example HDR combination processing, determines a combination ratio on the basis of the amount of movement (attribute data) on a plurality of images of the same scene captured with different exposure times, and performs blending processing.

The image geometrical transformation unit 810 performs a process of correcting the shake of the imaging device when capturing video image, for example. Specifically, the image geometrical transformation unit 810 detects, from each of subsequent frames, four vertices corresponding to the four vertices of the quadrangle which has been set in the first frame, and transforms the detected quadrangle into a predetermined rectangle.

On the other hand, assuming that the attribute map has resulted from calculating an amount of movement for each 64×64 region of an image (image before geometric transformation), for example, the resolution in the attribute map turns out to be 1/64 in comparison with the image. In other words, it suffices that the attribute data geometrical transformation unit 820 performs a transformation of 64-times enlargement (a process of absorbing the difference of resolutions between the image and the attribute map) in addition to the geometric transformation corresponding to the shake correction in order to input attribute data corresponding to pixels to the combining unit 830.

In the aforementioned configuration, the image geometrical transformation unit 810 implements general projection transformation, and the attribute data geometrical transformation unit 820 is implemented using the configuration of the image processing apparatus 100 of embodiment 1. A specific setting method of the attribute data geometrical transformation unit 820 will be described. The quadrangle after transformation (the first coordinates) is assumed to be the same as the quadrangle in the image geometrical transformation unit 810 (the predetermined rectangle). The quadrangle before transformation (the second coordinates) is used with the coordinates of the detected four vertices being multiplied by 1/64.

In the present embodiment, although the attribute data geometrical transformation unit 820, unlike the image processing apparatus 100 of embodiment 1, applies geometric transformation to the attribute data instead of the image data, geometric transformation may be similarly applied to a group of data stored in accordance with two-dimensional coordinate positions. Generally, there is a concern that a high arithmetic precision is required for coordinate calculation to realize enlargement/reduction processing with a high magnification factor, with a complicated arithmetic operation particularly in the case of non-linear transformation, which may lead to a high arithmetic operation cost. However, using the attribute data geometrical transformation unit 820 of the present embodiment, the 64-times enlargement is linear transformation and therefore the coordinate linear transformation unit 110 performs a highly precise transformation, and only the residual difference is calculated by the coordinate non-linear transformation unit 120. Accordingly, it is possible to suppress the arithmetic operation cost relatively low.

Embodiment 5

Figure 10A:
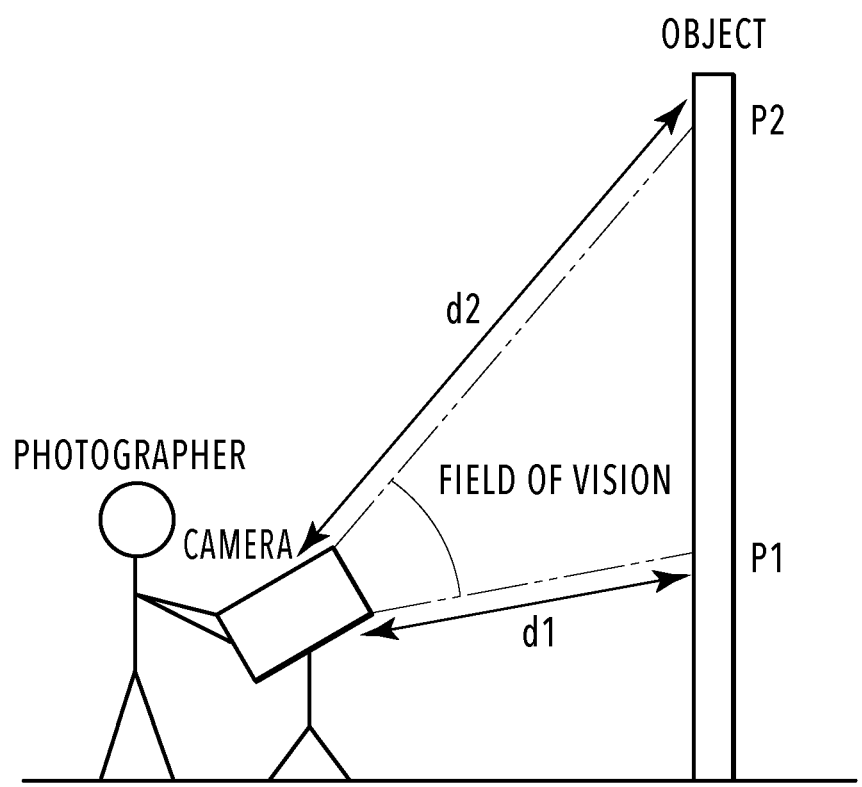
FIG. 10A illustrates an exemplary geometric transformation in embodiment 5.
Figure 10B:
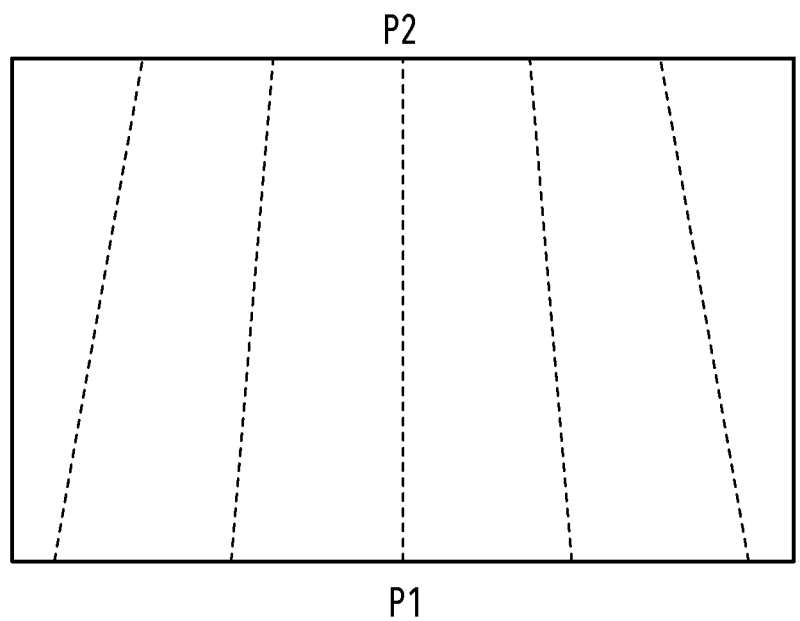
FIG. 10B illustrates an exemplary geometric transformation in embodiment 5.
Figure 10C:
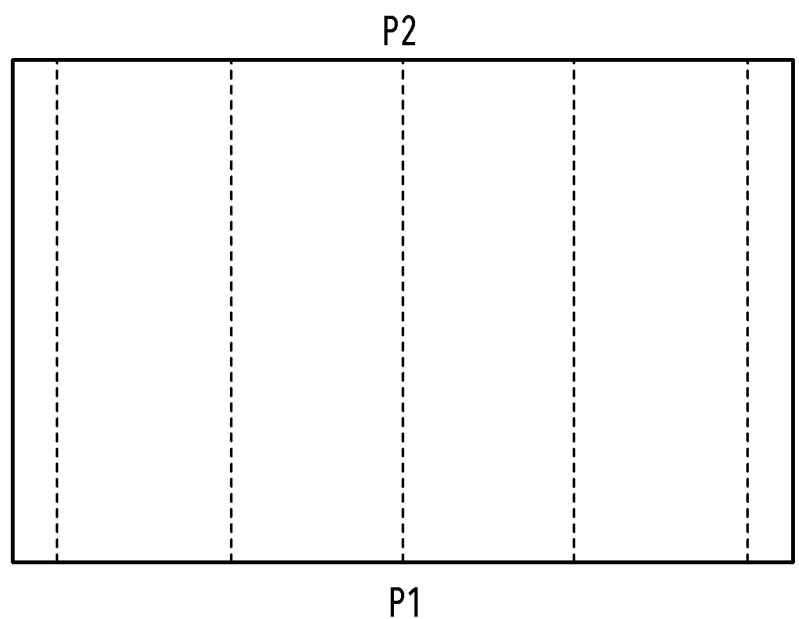
FIG. 10C illustrates an exemplary geometric transformation in embodiment 5.

Although the control unit 180 determines the transformation parameters on the basis of the before- and after-transformation coordinates of the four vertices in embodiment 1, this is not limiting. In a case, for example, a distance sensors is provided in the image movie camera device so that information of the distance to the object is available, transform parameters may be obtained on the basis of the distance information. As an example, a case of performing tilt shooting upward from the front of a planar object such as a construction will be described, referring to FIGS. 10A to 10C. As illustrated in FIG. 10A, d1 denotes the distance to the lower end P1 of the field of vision of the camera, and d2 denotes the distance to the upper end P2 of the field of vision of the camera. In this case, the captured image turns out to be an image shrinking in the horizontal direction as the viewer's eyesight shifts upward, as illustrated in FIG. 10B. The dashed line in the drawing is an auxiliary line, indicating the vertical direction, which is corrected as illustrated in FIG. 10C. In other words, the captured image is subjected to same-size processing in the horizontal direction at the lower end P1 of the image, and multiplied by d2/d1 in the horizontal direction at the upper end P2 of the image. In the following, description will be provided with the magnification factor R being d2/d1.

In the case of performing the foregoing deformation, the linear transformation unit 110 multiplies the entire image by $(R+1)/2$ (i.e., mean of magnification factors at the lower end and the upper end) in the horizontal direction, for example, to increase the linear transformation component. Specifically, it suffices to set the Affine coefficients such as $a=(R+1)/2$, $b=0.0$, $c=0.0$, $d=1.0$, $e=W\times(R-1)/4$, $f=0.0$, or the like. Here, W is the image width. The parameters of non-linear transformation are calculated from the residual difference with the final result of arithmetic operation (FIG. 10C) similarly to embodiment 1, when the parameters of linear transformation are determined.

As has been described above, an example of calculating transformation parameters on the basis of information of the distance to the object has been described in the present embodiment. Note that transformation parameters may be calculated using values of a gyro sensor, zoom values of a lens or the like, besides the distance information. In a case where the device is fixed, with limited use cases, there may be a configuration in which a plurality of parameter sets are preliminarily stored and selectively switched in accordance with the use case.

Other Embodiments

Embodiment(s) of the present invention can also be realized by a computer of a system or apparatus that reads out and executes computer executable instructions (e.g., one or more programs) stored on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing apparatus (CPU), micro processing apparatus (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, a highly precise geometric transformation may be realized with a relatively small amount of arithmetic operation resources.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus for performing geometrical transformation of data stored in accordance with two-dimensional coordinate positions, the apparatus comprising:
    a control unit configured to decompose a transformation processing from first coordinates to second coordinates into linear transformation and non-linear transformation, the control unit also being configured to determine transformation parameters for the linear transformation and the non-linear transformation;
    a linear transformation unit configured to perform the linear transformation of the first coordinates to calculate third coordinates;
    a non-linear transformation unit configured to perform the non-linear transformation of the first coordinates to calculate fourth coordinates; and
    a combining unit configured to combine the third coordinates and the fourth coordinates to calculate the second coordinates, wherein
    the control unit determines the transformation parameters so that a third quadrangle formed by the third coordinates becomes a quadrangle approximate to a second quadrangle formed by the second coordinates, and sets the transformation parameters for the linear transformation unit and the non-linear transformation unit, respectively.

2. The image processing apparatus according to claim 1, wherein the control unit obtains coordinates of four vertices of a first quadrangle formed by the first coordinates and coordinates of four vertices of a second quadrangle formed by the second coordinates, and determines the transformation parameters on a basis of the obtained coordinates of the four vertices.

3. The image processing apparatus according to claim 2, wherein the control unit determines the transformation parameters so that three points out of the four vertices of the third quadrangle coincide with three points out of the four vertices of the second quadrangle.

4. The image processing apparatus according to claim 2, wherein the control unit determines the transformation parameters so that an absolute value sum of distances between the four vertices of the third quadrangle and the four vertices of the second quadrangle becomes smallest.

5. The image processing apparatus according to claim 2, wherein the control unit determines the transformation parameters so that a ratio of an area within the area of the third quadrangle that overlaps with the area of the second quadrangle becomes largest.

6. The image processing apparatus according to claim 1, wherein the control unit decomposes the transformation processing into addition of the linear transformation and the non-linear transformation, and the combining unit adds the third coordinates and the fourth coordinates to calculate the second coordinates.

7. The image processing apparatus according to claim 1, wherein the control unit decomposes the transformation processing into multiplication of the linear transformation and the non-linear transformation, and the combining unit multiplies the third coordinates and the fourth coordinates to calculate the second coordinates.

8. The image processing apparatus according to claim 1, wherein the linear transformation is a transformation which is expressible by Affine transformation, and the non-linear transformation is a transformation inexpressible by Affine transformation.

9. The image processing apparatus according to claim 1, wherein arithmetic precision of the non-linear transformation is lower than arithmetic precision of the linear transformation.

10. The image processing apparatus according to claim 1, wherein absolute values of results of the non-linear transformation are smaller than absolute values of results of the linear transformation.

11. The image processing apparatus according to claim 1, wherein the data stored in accordance with the two-dimensional coordinate positions is image data, and the transformation processing is a transformation processing from the coordinates of the image after geometric transformation to the coordinates of the image before geometric transformation, the apparatus further comprising a unit configured to read the data from an external memory in accordance with coordinates of the image before geometric transformation.

12. The image processing apparatus according to claim 1, wherein the data stored in accordance with the two-dimensional coordinate positions is image data, and the transformation processing is a transformation processing from the coordinates of the image before geometric transformation to the coordinates of the image after geometric transformation, and the apparatus further comprising a unit configured to write the data into an external memory in accordance with coordinates of the image after geometric transformation.

13. An image processing apparatus for combining a plurality of sets of image data, the apparatus comprising:
    an image geometrical transformation unit configured to perform geometry transform of the plurality of sets of image data;

an attribute data geometrical transformation unit configured to perform geometrical transformation of the attribute data; and an image combining unit configured to combine the plurality of sets of image data subjected to geometrical transformation by the image geometrical transformation unit, on a basis of the attribute data subjected to geometrical transformation by the attribute data geometrical transformation unit, wherein the attribute data geometrical transformation unit includes:

a control unit configured to decompose a transformation processing from first coordinates to second coordinates into linear transformation and non-linear transformation, the control unit also being configured to determine transformation parameters for the linear transformation and the non-linear transformation;

a linear transformation unit configured to perform the linear transformation of the first coordinates to calculate third coordinates;

a non-linear transformation unit configured to perform the non-linear transformation of the first coordinates to calculate fourth coordinates; and a combining unit configured to combine the third coordinates and the fourth coordinates to calculate the second coordinates, wherein the control unit determines the transformation parameters so that a third quadrangle formed by the third coordinates becomes a quadrangle approximate to a second quadrangle formed by the second coordinates, and sets the transformation parameters for the linear transformation unit and the non-linear transformation unit, respectively.

14. An image processing method of performing geometrical transformation of data stored in accordance with two-dimensional coordinate positions, the method comprising the steps of:

controlling of decomposing a transformation processing from first coordinates to second coordinates into linear transformation and non-linear transformation, and of determining transformation parameters for the linear transformation and the non-linear transformation;

performing the linear transformation of the first coordinates in accordance with the transformation parameters for the linear transformation determined in the controlling step to calculate third coordinates;

performing the non-linear transformation of the first coordinates in accordance with the transformation parameters for the non-linear linear transformation determined in the controlling step to calculate fourth coordinates; and combining the third coordinates and the fourth coordinates to calculate the second coordinates, wherein the controlling step includes determining the transformation parameters so that a third quadrangle formed by the third coordinates becomes a quadrangle approximate to a second quadrangle formed by the second coordinates.

15. A non-transitory computer readable storage medium storing a program for causing a computer to perform an image processing method of performing geometrical transformation of data stored in accordance with two-dimensional coordinate positions, the method comprising the steps of:

controlling of decomposing a transformation processing from first coordinates to second coordinates into linear transformation and non-linear transformation, and of determining transformation parameters for the linear transformation and the non-linear transformation;

performing the linear transformation of the first coordinates in accordance with the transformation parameters for the linear transformation determined in the controlling step to calculate third coordinates;

performing the non-linear transformation of the first coordinates in accordance with the transformation parameters for the non-linear linear transformation determined in the controlling step to calculate fourth coordinates; and combining the third coordinates and the fourth coordinates to calculate the second coordinates, wherein the controlling step includes determining the transformation parameters so that a third quadrangle formed by the third coordinates becomes a quadrangle approximate to a second quadrangle formed by the second coordinates.

* * * * *